United States Patent Office 3,247,104
Patented Apr. 19, 1966

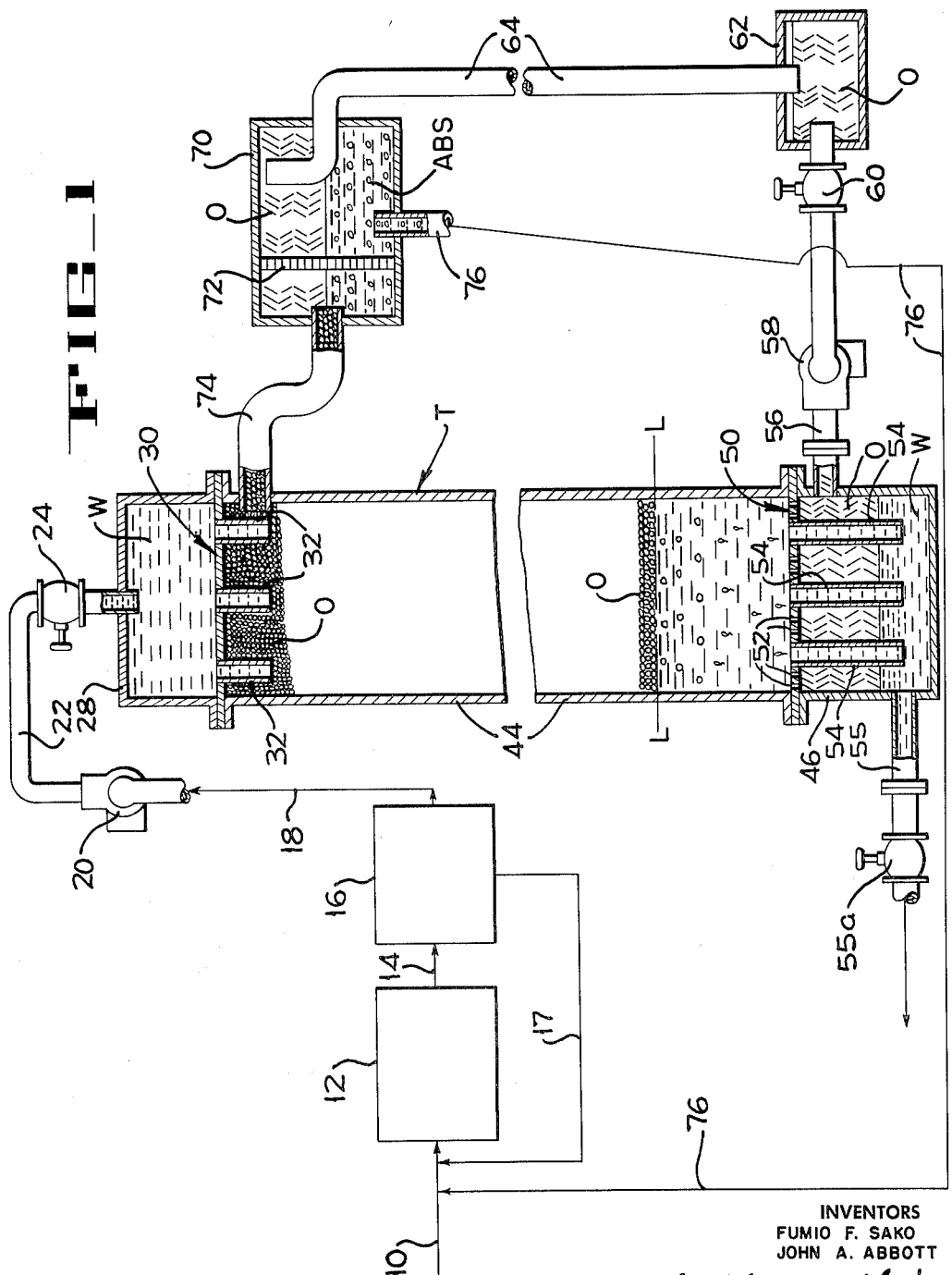

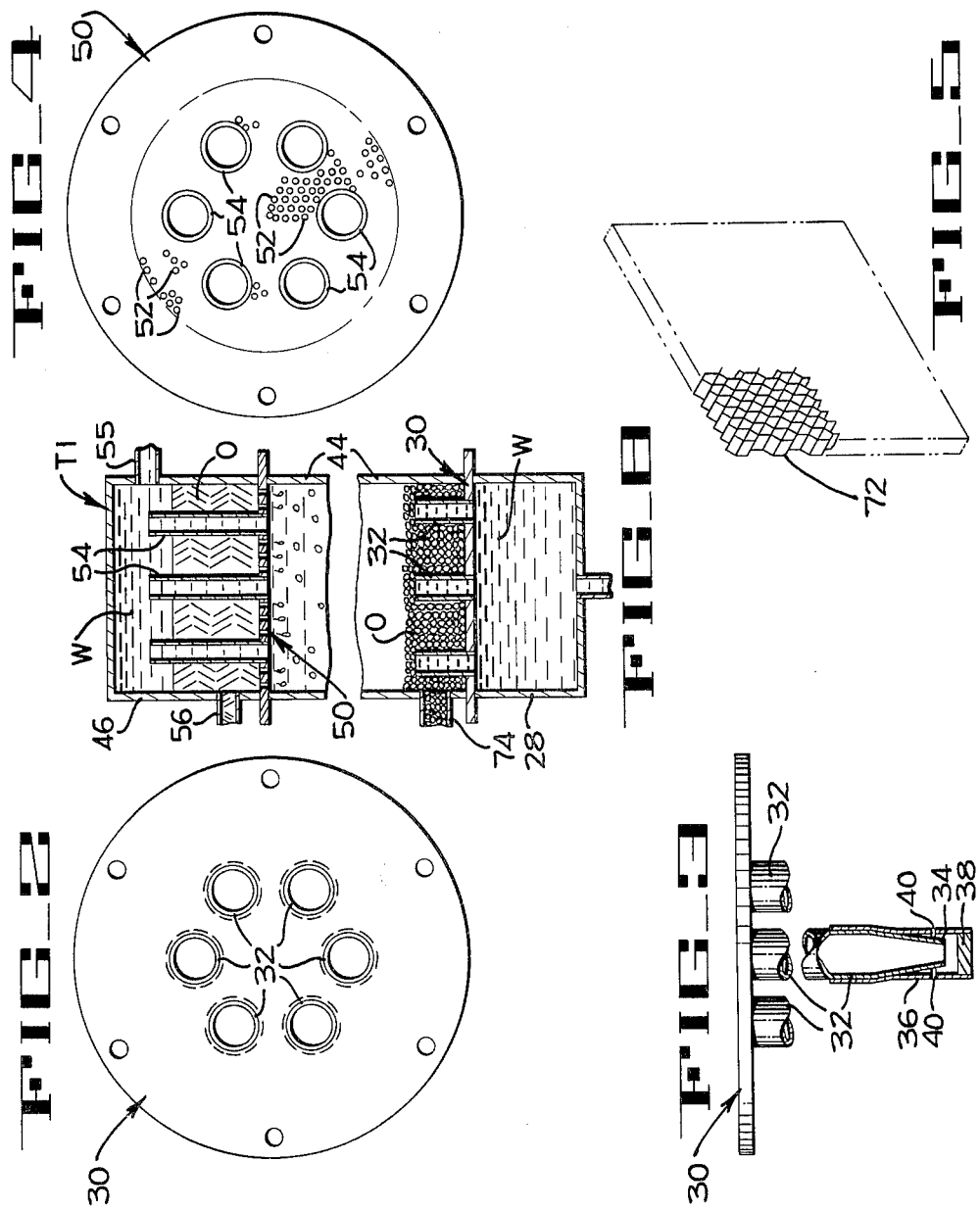

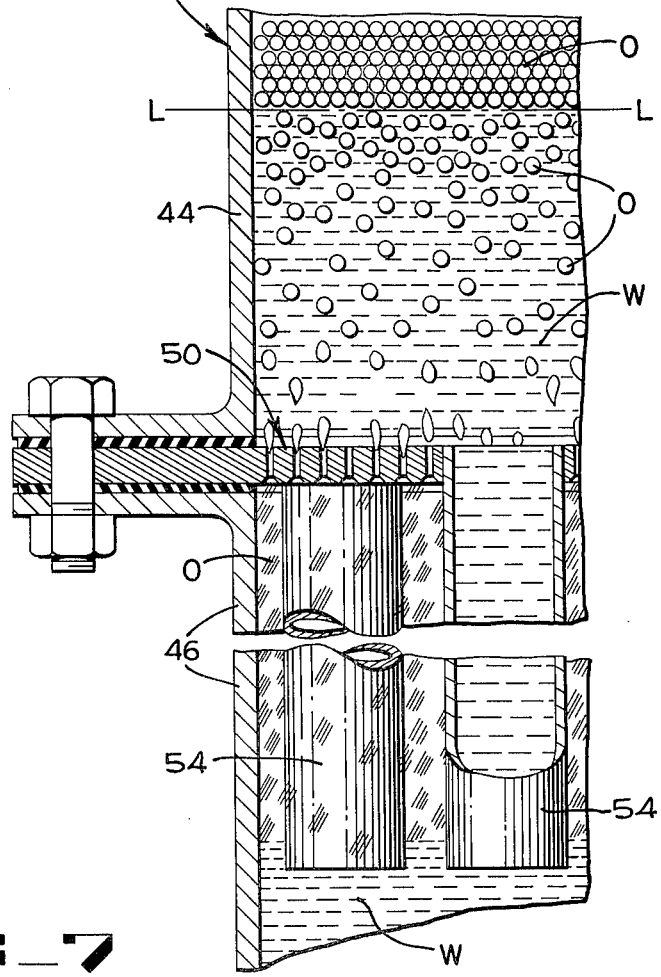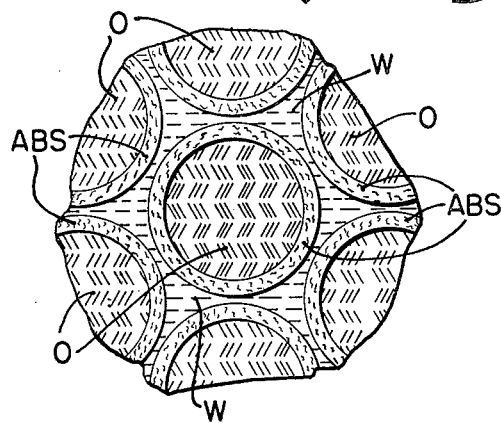

3,247,104
METHOD AND APPARATUS FOR REMOVING SURFACE ACTIVE AGENTS FROM WATER
Fumio F. Sako, San Jose, and John A. Abbott, Menlo Park, Calif., assignors to FMC Corporation, San Jose, Calif., a corporation of Delaware
Filed Mar. 26, 1963, Ser. No. 268,151
4 Claims. (Cl. 210—21)

This invention relates to liquid purification, and more particularly to a method of removing soluble organic surface active agents from water and to an apparatus for carrying out the method.

In the arts of sewage purification, the purification of industrial waste water, commercial water purification, and similar liquid purification processes wherein the liquid under treatment is water, difficulty has been encountered in providing adequate removal of certain soluble organic materials from the water. The introduction of a number of relatively new chemicals into our economy has increased the importance of preventing water containing appreciable amounts of such materials from entering commercial and domestic water supplies, wells, streams, lakes, or any water source wherein anything other than a very weak solution of such materials is undesirable.

For example, in the operation of sewage disposal systems, the effluent waste water is purified and is then usually discharged to lakes or streams. However, it has been found that the bacterial and chemical agents employed in such systems do not attack and destroy all of the high molecular weight, soluble organic materials that were dissolved in the sewage before it entered the purification plant. Examples of such high molecular weight, soluble organic materials are detergents and insecticides, many of which are aliphatic or aromatic hydrocarbon compositions.

For example, common detergents that enter sewage plants from the home, or from industrial uses, are a group of detergents that include sodium alkyl benzene sulfonate, derived from tetrapropylene, usually referred to as ABS. Insecticides such as DDT, Aldrin, and other high molecular weight hydrocarbons also enter and pass through sewage disposal systems, without being entirely removed in the sewage systems.

As mentioned, these solutions of organics find their way into streams, lakes, wells and the like. They may, for example, reach sources of domestic water supply, in which case their presence is evidenced by undesirable foaming at the tap. Similarly, small streams and canals may froth and foam, due to the presence of these soluble organics in the water.

Many of these high molecular weight soluble organics are commonly referred to as surface active agents, sometimes referred to as "surfactants." In accordance with present invention, the method of reducing the concentration of such surface active agents in water takes advantage of the peculiar properties of the large molecules, of which these agents are made. The molecules of these surface active agents have been found to present both hydrophilic and hydrophobic characteristics. This effect is commonly explained by evidence that one "end" of one of these long chain molecules is hydrophilic (having a strong affinity for water), whereas the opposite "end" of the same molecule, is described technically as being hydrophobic (repelled by water).

In the present invention, advantage is taken of the fact that, when an interface is presented between a liquid (such as oil), that is immiscible with water, and the water in which the surface active agents are dissolved, the hydrophobic portions of the large molecules are repelled by the water and hence (relatively) are attracted to, and cling to, the surface of the oil body forming the interface. On the other hand, the hydrophilic portions of the molecules present themselves to the water body. The result of this action is that a thin film or concentrated solution of the surface active agents is formed upon, and clings to the oil body, at the oil-water interfaces.

Briefly, in the present invention a large number of such interfaces, providing a large total contact area, are formed between discrete droplets of oil flowing countercurrently to the water under treatment in a tower or the like. These oil droplets are removed from one end of the treatment tower, are coalesced, and the concentrated solution is separated out from the resulting body of oil. There is no foaming or emulsification involved.

An object of the present invention is to make effective use of the phenomenon just described in the removal of soluble organics from water, including waste water and sewage effluents.

Another object of the invention is to provide a method and apparatus for providing a very large area hydrocarbon interface at which the aforesaid fractionating or separation action can occur, and without requiring the use of foams or emulsions, both of which are difficult to handle after the fractionating or separation steps have been carried out.

A further object of the present invention is to make possible simple and effective separation of surfactants from water by a process that is not sensitive to the hydrogen ion concentration (pH) of the solution.

Another object is to provide a process and apparatus of the type described, wherein the temperature of the solution is not critical to the effectiveness of the separation, or fractionating operation.

Further objects of the present invention are to provide a process that is economical, and permits re-use or recycling of the hydrocarbon oil that forms the interface for the fractionating process.

The manner in which these and other objects of the invention may be practiced by those skilled in the art, will be apparent from the following detailed description of the invention. In the drawings:

FIGURE 1 is a diagram showing the fractionating apparatus of the present invention, connected into a sewage disposal system, and wherein the specific gravity of the dispersed phase liquid (an oil) is less than that of the continuous phase liquid (water).

FIGURE 2 is a plan of the water distribution plate used in the fractionating apparatus of FIGURE 1.

FIGURE 3 is a fragmentary elevation of the water distribution plate of FIGURE 2 with parts broken away.

FIGURE 4 is a plan of the oil dispersing plate of the apparatus of FIGURE 1.

FIGURE 5 is a diagrammatic perspective showing the honeycomb oil coalescing member.

FIGURE 6 is an enlarged fragmentary diagrammatic section showing the oil dispersing action.

FIGURE 7 is a schematic diagram illustrating the formation of an enriched solution of surface active agents at the oil and water interfaces.

FIGURE 8 is a diagram illustrating a modified form of the invention wherein the specific gravity of the dispersed phase liquid is greater than that of the continuous phase liquid.

Although the use of the fractionating tower of the present invention is not so limited, in FIGURE 1 the tower is shown connected into a sewage system, for removal of surface active agents, such as ABS, from the discharge water of the sewage system. The sewage system forms no part of the invention, and hence is shown diagrammatically. The sewage system has a sewage feed line 10, which conducts raw sewage into an activated sludge chamber or basin 12. The outlet of this basin is connected by a line 14 to a settling basin 16. Sludge that settles out in the settling basin is returned to the sewage feed line 10, by a sludge return line 17. The water that leaves the settling basin 16, is relatively pure, except that it may contain high molecular weight soluble organics, which the bacterial and chemical actions of the sewage plant cannot entirely remove. The concentration of such organics, such as DDT and ABS, in the water leaving the settling basin, may be five or more parts per million. This water leaving the sewage system is conducted by a line 18 to a pump 20, which delivers the water to an inlet line 22, and then to an inlet control valve 24 leading to the fractionating tower T, of the present invention.

In the embodiment of the invention being described, the fractionating tower T is formed in three sections. There is an upper, or water admission section 28, into which the water W is conducted under control of the inlet valve 24. The lower portion of the upper section 28 of the fractionating tower is bounded by a water admission plate 30, from which depends water admission pipes, tubes or downcomers 32. The construction of the plate 30, and the downcomers 32, is shown in detail in FIGURES 2 and 3. The number of downcomers 32 depends upon the diameter and capacity of the tower, six being illustrated in the installation being described. The lower end of each tube 32 is restricted somewhat, forming a nozzle 34, which nozzle is surrounded by a baffle 36. The lower end of each baffle 36 is closed as at 38, and the water is released through a number of ports 40, that pierce the baffle 36.

There is also a main, fractionating, or treatment section of the tower T, formed as a column 44. The column 44 is relatively long, in order to provide ample time for the soluble organics to form a film of enriched solution on the surface of the oil droplets in the column.

A lower section 46 completes the tower T. Section 46 is a combined oil admission and water removal section. The upper wall of the lower section 46 is in the form of an oil dispersing, or droplet forming plate 50, which is formed with a number of nozzles or bores 52, through which oil O is dispersed from a body of oil lying beneath the oil dispersing plate 50. Depending from the oil dispersing plate 50 are a number of downcomers 54 for conducting the water W through the body of oil O, and out of the main or fractionating section 44 of the tower. In the embodiment of the invention being illustrated, the oil in the system is lighter than the water, so that there is a body of water W beneath the body of oil O, in the lower section 46 of the tower. The water is withdrawn from the lower section of the tower by a water effluent line 55, under control of a valve 55a.

Oil is admitted to the lower section 46 of the tower T by an oil inlet line 56 connected to a pump 58. The amount of oil admitted is under control of a valve 60, the oil being withdrawn by the pump from a sump unit 62.

Oil enters the sump 62, by means of a line 64 that extends downwardly from a combined oil coalescing and phase separator unit 70. In the separator unit 70, an oil breaker 72 in the form of a honeycomb member is provided, although such a breaker is not indispensable to the practice of the invention. The surface enriched droplets of oil are conducted from the upper portion of the fractionating section 44 of the tower T by a line 74, from which line the oil droplets enter the phase separator unit 70.

In the phase separator 70, the surface enriched oil droplets are broken and coalesced into a body of oil O, and a body of organic-enriched water solution. The honeycomb breaker 72 (FIG. 5) assists in the coalescing of the oil droplets. When detergents such as ABS are contained in the water, the water phase in the separator 70 is a solution of ABS that is more concentrated than the solution within the water that entered the fractionating tower for treatment. This enriched solution of ABS or the like, is returned to the sewage feed line 10 by means of a solution withdrawal line 76. Experience with sewage disposal plants has demonstrated that bacteria and other active agents found in sewage disposal systems will attack and break down relatively enriched solutions of ABS, and other high molecular weight organics, whereas very dilute solutions of the same materials are not effectively treated. This recycling has been proven to reduce the concentration of the active agents in the effluent, from that present when no enriched solution is introduced into the system.

The action at the oil dispersing plate is illustrated in FIGURE 6. In a typical design, the diameter of the orifices 52 in the oil dispersion plate 50 will be in the order of $1/16$th of an inch, and the resulting droplets of oil will have a diameter slightly under $1/8$ of an inch. The oil leaves the orifices in the dispersion plate 50 in the form of small streamlets which, due to the surface tension of the oil, soon assume a spherical shape, and form spherical droplets of oil. Assuming that the rate of oil admission is held constant, the flood line, indicated at L on FIGURES 1 and 6, can be brought fairly close to the dispersion plate 50, by adjusting the rate of water admission. This adjustment is made by means of valve 24, or by means of a level tank (not shown), these means for adjusting the water admission being equivalents.

It has been found that the oil droplets soon rise and pack to form a column of closely packed oil droplets, which column reaches the geometrical condition of closely packed spheres. This represents the optimum condition for maximizing the interface area. However, the droplets remain discrete, and thereby continuously present a large area interface for the accumulation of the films of concentrated solution of surface active agents that were formerly in a relatively dilute solution in the water. This column of closely packed oil droplets slowly rises in the treatment section 44 of the tower T until they encounter plate 30. The packed oil droplets are withdrawn from the upper portion of section 44 of the tower by means of the line 74. As previously explained, the oil droplets are coalesced in separator 72, and the enriched solution (such as ABS) separates out. The oil is then reintroduced into the tower.

An oil suitable for the practice of the invention is a high molecular weight, saturated hydrocarbon oil sold to the trade as "Shell Deodorized Spray Base." This oil has a molecular weight of 178, a density at 15° C. of D.807, and a centipoise viscosity at 30° centigrade of 1.93 centistokes.

FIGURE 7 is a schematic diagram showing the action that takes place in the column, wherein a film of concentrated solution of the soluble organics (ABS in the example) is deposited on the interfaces between the oil droplets O and the body of water W. As mentioned, in a typical installation, the apparatus of the invention will accept water having a concentration of surface active agents, such as detergents and ABS, of 5 or more parts per million, and will reduce the concentration of these agents in the water leaving the column to 1 part per million. Stated differently, the removal rate is in the order to 80%. The oil can be considered to act as a "collecting liquid" for the surface active agents.

The apparatus as illustrated employs an oil that is somewhat lighter than water. If an oil were employed that is heavier than water, the oil droplets would fall down through the water, and the water would rise in the column. Such a tower is shown as tower T1 in FIGURE 8 of the drawings. It can be seen that the tower T1 is simply the tower T, previously described, operating in an inverted position. Except for the directions of water and oil flow relative to the earth, the mode of operation of the embodiment of FIGURE 8 is identical to that of the embodiment previously described.

It has been mentioned that the rate of oil admission is held constant and the position of the flood line L (FIGS. 1 and 6) is determined by adjusting the rate of water (continuous phase) liquid through the tower.

Since the position of the flood line L is actually determined by the relative rates of oil and water flow, the rate of water flow may be held at some selected value, and the oil flow rate adjusted to position the flood line L as close to the oil dispersing plate as is practical.

In the appended claims, the droplets of the dispersed phase liquid are defined as being completely immiscible with water. Of course it is recognized that even the oil referred to in the specification as being an example of an oil suitable for practicing the invention, has some inherent miscibility with water, but it is so small that for all practical purposes it is non-existent. In fact, there are no completely immiscible liquids in the strictest sense of the word. In the present invention the immiscibility of the oil and water is so complete that there is not enough oil carried out with the water to represent any significant contamination of the water, and that situation defines the meaning of the term "completely immiscible" in the claims. There are liquids which could be used as the dispersed phase liquid such as ether, for example, that are partially miscible with water, that is, miscible to an extent that enough of these liquids would be carried over with the water to contaminate the water unacceptably. The term "completely immiscible" as employed in the claims excludes liquids such as ether, certain alcohols, etc., which would contaminate the water.

Having completed a detailed description of the invention so that those skilled in the art may practice the same, I claim:

1. Apparatus for removing surface active agents dissolved in water comprising a treatment tower, means for admitting water adjacent one end of the tower for flow through the tower, an orificed dispersing plate adjacent the other end of the tower, water pipe means projecting from said dispersing plate in the direction of water flow through the tower, means for withdrawing the water from the tower adjacent the outlet of said water pipe means, a source of agent collecting liquid that is completely immiscible with water and has an affinity for the surface active agents dissolved in the water, means for admitting said collecting liquid to said tower between the outlet of said water pipe means and said dispersing plate, means for causing said collecting liquid to flow through the orifices in said dispersing plate at a rate relative to the rate of water flow to form discrete droplets that come together in a packed column of droplets, which column moves countercurrently to the flow of water in the tower, means for removing the packed droplets adjacent said one end of the tower, means outside of the tower for coalescing the removed droplets and for separating the coalesced body of collecting liquid and the enriched solution of surface active agents formerly clinging to the surface of the droplets.

2. The method of reducing the concentration of surface active agents dissolved in water comprising the steps of passing a column of water in one direction through a treatment tower as a continuous phase liquid, dispersing discrete droplets of a collecting liquid that is completely immiscible with water into the continuous phase column adjacent the end of the treatment tower toward which the water is flowing, causing said droplets to flow countercurrently to the continuous phase column of water for a time sufficient to cause the agents to concentrate at the interfaces between said droplets and the water as a film of enriched water solution of the agents, removing said droplets and their associated films of enriched solution of agents from the treatment tower with the droplets remaining discrete and introducing them into a separating zone outside of the tower, coalescing the droplets into a homogenous body of collecting liquid in said separating zone, and withdrawing the coalesced collecting liquid and the enriched solution of agents separately from said separating zone.

3. Method of claim 2, wherein said collecting liquid is a saturated hydrocarbon oil.

4. A method of removing high molecular weight, water soluble organics from water comprising the steps of passing the water through a treatment tower towards one end of the tower, forming discrete droplets of a completely immiscible saturated hydrocarbon oil, causing the oil droplets to move countercurrently to the water in the treatment tower towards the other end of the tower to provide a large area interface for the formation of a concentrated water solution film of the soluble organics, removing the oil droplets and their associated films from the end of the tower to which they are flowing and introducing them into a separating zone outside of the tower, coalescing the oil droplets in said separating zone to provide a homogenous body of oil and a body of the concentrated water solution of the organics, and withdrawing the coalesced body of oil and the body of concentrated solution of soluble organics separately from said separating zone.

References Cited by the Examiner

UNITED STATES PATENTS 2,729,549  1/1956  Reman et al. _____ 23—267 X
2,912,310  11/1959  Walley et al. _____ 23—310 X

FOREIGN PATENTS 404,261  4/1932  Great Britain.
373,897  6/1932  Great Britain.
617,250  2/1949  Great Britain.

MORRIS O. WOLK, *Primary Examiner.*